US012326962B2

(12) United States Patent
Pechersky

(10) Patent No.: US 12,326,962 B2
(45) Date of Patent: *Jun. 10, 2025

(54) PRIVACY PRESERVING LOCATION TRACKING

(71) Applicant: ANAGOG LTD., Tel Aviv (IL)

(72) Inventor: Igor Pechersky, Karney Shomron (IL)

(73) Assignee: ANAGOG LTD., Tel Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/612,690

(22) Filed: Mar. 21, 2024

(65) Prior Publication Data
US 2024/0256712 A1    Aug. 1, 2024

Related U.S. Application Data

(63) Continuation of application No. 17/389,730, filed on Jul. 30, 2021, now Pat. No. 11,966,496, which is a continuation of application No. PCT/IL2020/050133, filed on Feb. 4, 2020.

(60) Provisional application No. 62/801,332, filed on Feb. 5, 2019.

(51) Int. Cl.
*G06F 21/62* (2013.01)

(52) U.S. Cl.
CPC .. *G06F 21/6254* (2013.01); *G06F 2221/2111* (2013.01)

(58) Field of Classification Search
CPC ............ G06F 21/6254; G06F 2221/2111
See application file for complete search history.

(56) References Cited

U.S. PATENT DOCUMENTS

| 8,538,442 | B1 * | 9/2013 | Ettinger | H04W 40/244 455/446 |
| 2007/0264974 | A1 | 11/2007 | Frank et al. | |
| 2010/0234046 | A1 * | 9/2010 | Wood | H04W 64/00 455/456.3 |
| 2012/0331561 | A1 | 12/2012 | Broadstone et al. | |

(Continued)

OTHER PUBLICATIONS

Supplementary European Search Report issued for European Application No. 20753116.1 dated Jun. 12, 2023.

(Continued)

*Primary Examiner* — Stephen T Gundry
(74) *Attorney, Agent, or Firm* — Myers Wolin, LLC

(57) ABSTRACT

A method, an apparatus and a computer program for tracking location of users without disclosing Personally Identifiable Information (PII). The method comprises analyzing sequences of location events of a user over time to determine a Point Of Interest (POI) of the user. In response to determining that the POI is PII-revealing POI; obfuscating the POI, by generating a pseudolocation identifier of the POI indicative of a semantic meaning thereof to the user without revealing a geographic location of the POI. The method further comprises generating an anonymized sequence of location events of the user based on the sequence of location events, that comprises the pseudolocation identifier to represent location events associated with the POI, and absent of the geographic location thereof. The anonymized sequence of location events may be provided a third party to analyze behavior of the user without divulging identity of the user.

20 Claims, 8 Drawing Sheets

(56) References Cited

U.S. PATENT DOCUMENTS

| | | | |
|---|---|---|---|
| 2014/0310366 A1* | 10/2014 | Fu | H04L 51/04 |
| | | | 709/206 |
| 2015/0169891 A1* | 6/2015 | Hook | G06Q 30/0257 |
| | | | 726/29 |
| 2016/0203336 A1* | 7/2016 | Nambiar | G06F 21/6245 |
| | | | 726/26 |
| 2017/0083708 A1* | 3/2017 | Braghin | G06F 16/2365 |
| 2018/0302415 A1* | 10/2018 | Chakraborty | H04W 4/025 |
| 2019/0171943 A1* | 6/2019 | Pao | G06F 16/29 |
| 2019/0220526 A1* | 7/2019 | Lear | G01C 21/3679 |
| 2020/0019585 A1* | 1/2020 | Balu | G06F 16/287 |
| 2020/0068347 A1* | 2/2020 | Warren | H04W 4/021 |
| 2020/0394332 A1* | 12/2020 | Jakobsson | G06F 16/24573 |
| 2021/0081559 A1* | 3/2021 | Gratton | H04W 4/02 |
| 2021/0157828 A1* | 5/2021 | Boyns | H04W 4/02 |
| 2021/0172759 A1* | 6/2021 | Li | G08G 1/0129 |
| 2021/0182111 A1* | 6/2021 | Jakobsson | G06F 9/5055 |
| 2021/0202067 A1* | 7/2021 | Williams | G06Q 50/265 |
| 2021/0232609 A1* | 7/2021 | Milton | G06F 16/2379 |
| 2022/0050921 A1* | 2/2022 | LaFever | G16H 10/60 |
| 2022/0116736 A1* | 4/2022 | Williams | G16H 50/20 |
| 2022/0136840 A1* | 5/2022 | Mokhnatkina | G06Q 30/02 |
| | | | 701/426 |
| 2022/0156761 A1* | 5/2022 | Haberman | G06Q 30/0201 |
| 2022/0188699 A1* | 6/2022 | Matlick | G06F 21/6254 |
| 2022/0286482 A1* | 9/2022 | Barday | H04L 51/18 |
| 2022/0335473 A1* | 10/2022 | Hartzell | G06Q 50/01 |
| 2022/0353632 A1* | 11/2022 | Williams | A61B 5/165 |
| 2022/0386080 A1* | 12/2022 | Williams | H04W 4/029 |
| 2023/0007439 A1* | 1/2023 | Williams | G06Q 10/0635 |
| 2023/0054446 A1* | 2/2023 | LaFever | H04W 12/75 |
| 2023/0179955 A1* | 6/2023 | Williams | A61B 5/4833 |
| | | | 455/456.1 |
| 2023/0232052 A1* | 7/2023 | Khavronin | H04N 21/251 |
| | | | 709/219 |

OTHER PUBLICATIONS

Lee et al., "Protecting Location Privacy Using Location Semantics", KDD'11, Aug. 21-24, 2011, pp. 1289-1297, San Diego, California, USA.

Li et al., "Privacy Leakage of Location Sharing in Mobile Social Networks: Attacks and Defense", IEEE, 2016, pp. 1-14.

Non-final Office Action issued for U.S. Appl. No. 17/389,730, dated Nov. 8, 2023.

International Search Report issued by the Israel Patent Office for corresponding International Patent Application No. PCT/IL2020/050133, mailed on Apr. 21, 2020.

Notice of Allowance and Fee(s) Due issued by the USPTO for U.S. Appl. No. 17/389,730, dated Feb. 16, 2024.

* cited by examiner

Day1: (6:30, Location 205), (7:00, Location 210), (7:30, (32.02;33.98)), (8:00, Location 230), (8:30, Location 225), ..., (15:00, Location 225), (15:30, Location 230), (16:00, Location 235), (16:30, Location 235), (17:00, Location 235), (17:30, Location 235), (18:00, (32.24;33.82)), (18:30, Location 210), (19:00, Location 205), ... (21:30, Location 205), ..., (22:00, (31.97;33.14)), (22:30, (31.88;33.12)), (23:00, Location 220), ... (00:30, Location 220), (01:00, (31.88;33.12)), (01:30, (31.97;33.14)), (02:00, Location 205),...(06:00, Location 205)

...

Day12: (6:30, Location 205), (7:00, Location 210), (7:30, (32.02;33.98)), (8:00, Location 230), (8:30, Location 225), ..., (15:00, Location 225), (15:30, Location 230), (16:00, Location 235), (16:30, Location 235), (17:00, Location 235), (17:30, Location 235), (18:00, (32.24;33.82)), (18:30, Location 210), (19:00, Location 205), ... (21:00, Location 205), (21:30, Location 210), (22:00, (32.04;33.22)), (22:30, (32.75;33.52)), (23:00, (32.04;33.22)), (23:30, Location 215), (00:00, Location 205),...(06:00, Location 205)

FIG. 3A

Day1: (7:00, Location 270), (7:30, (34.15;34.92)), (8:00, (34.98;35.00)), (8:30, Location 285), ..., (17:30, Location 285), (18:00, (334.98;35.00)), (18:30, Location 265), ..., (21:00, (34.98;35.00)), (21:30, (34.15;34.92)),(22:00, Location 270), ...(06:00, Location 270)

Day2: (7:00, Location 270), (7:30, (34.15;34.92)), (8:00, (34.98;35.00)), (8:30, Location 285), ..., (16:30, Location 285), (17:00, (334.98;35.00)), (17:30, Location 255), ..., (18:30, (34.98;35.00)), (19:00, Location 270), ... (20:30, Location 255), ... ,(22:00, Location 270), ...(06:00, Location 270)

Day3: (7:00, Location 270), (7:30, (34.15;34.92)), (8:00, (34.98;35.00)), (8:30, Location 285), ..., (17:00, Location 285), (17:30, (334.98;35.00)), (18:00, (34.98;35.00)), (18:30, Location 270), (19:00, Location 280), (21:00, Location 270), ...(06:00, Location 270)

.....

Day7: (7:00, Location 270), ..., (10:30, (34.15;34.92)), (11:00, Location 260), .... (15:00, Location 260), (15:30, (34.15;34.92)), (16:00, Location 270), ...(06:00, Location 270)

Day8: (7:00, Location 270), (7:30, (34.15;34.92)), (8:00, (34.98;35.00)), (8:30, Location 285), ..., (17:30, Location 285), (18:00, (334.98;35.00)), (18:30, (34.15;34.92)),(19:00, Location 270), ...(06:00, Location 270)

FIG. 3B

Day1: (6:30,Home123), (7:00, Parent's House), (7:30, (32.02;33.98)), (8:00, School), (8:30, Work), ..., (15:00, Work), (15:30, School), (16:00, Play Yard at Location 235), ..., (17:30, Play Yard at Location 235), (18:00, (32.24;33.82)), (18:30, Parent's House), (19:00, Home123), ... (21:30, Home123), ..., (22:00, (31.97;33.14)), (22:30, (31.88;33.12)), (23:00, Location 220), ... (00:30, Location 220), (01:00, (31.88;33.12)), (01:30, (31.97;33.14)), (02:00, Home123),...(06:00, Home123)

...

Day12: (6:30, Home123), (7:00, Parent's House), (7:30, (32.02;33.98)), (8:00, School), (8:30, Work), ..., (15:00, Work), (15:30, School), (16:00, Location 235), (16:30, Location 235), (17:00, Location 235), (17:30, Location 235), (18:00, (32.24;33.82)), (18:30, Location 210), (19:00, Home123), ... (21:00, Home), (21:30, Parent's House), (22:00, (32.04;33.22)), (22:30, (32.75;33.52)), (23:00, (32.04;33.22)), (23:30, Location 215), (00:00, Home123),...(06:00, Home123)

FIG. 3C

Day1: (7:00, Home), (7:30, (34.15;34.92)), (8:00, (34.98;35.00)), (8:30, Work), ..., (17:30, Work), (18:00, (34.98;35.00)), (18:30, Location 265), ..., (21:00, (34.98;35.00)), (21:30, (34.15;34.92)),(22:00,Home), ...(06:00, Home)

Day2: (7:00, Home), (7:30, (34.15;34.92)), (8:00, (34.98;35.00)), (8:30,Work), ..., (16:30, Work), (17:00, (34.98;35.00)), (17:30, Clinic), ..., (18:30, (34.98;35.00)), (19:00,Home), ... (20:30, Location 255), ... ,(22:00, Home), ...(06:00, Home)

Day3: (7:00, Home), (7:30, (34.15;34.92)), (8:00, (34.98;35.00)), (8:30, Work), ..., (17:00, Work), (17:30, (34.98;35.00)), (18:00, (34.98;35.00)), (18:30, Home), (19:00, Location 280), (21:00, Home), ...(06:00, Home)

.....

Day7: (7:00, Home), ..., (10:30, (34.15;34.92)), (11:00, Park at Location 260), .... (15:00, Park at Location 260), (15:30, (34.15;34.92)), (16:00, Home), ...(06:00, Home)

Day8: (7:00, Home), (7:30, (34.15;34.92)), (8:00, (34.98;35.00)), (8:30, Work), ..., (17:30, Work), (18:00, (34.98;35.00)), (18:30, (34.15;34.92)),(19:00, Home), ...(06:00, Home)

FIG. 3D

PRIVACY PRESERVING LOCATION TRACKING

CROSS-REFERENCE TO RELATED APPLICATION

This application is a continuation of and claims the benefit U.S. patent application Ser. No. 17/389,730, entitled "PRIVACY PRESERVING LOCATION TRACKING", filed Jul. 30, 2021, which is a National Phase of PCT Application PCT/IL2020/050133, entitled "PRIVACY PRESERVING LOCATION TRACKING", filed Feb. 4, 2020, which claims the benefit of US provisional patent application No. 62/801,332, entitled "PRIVACY PRESERVING LOCATION TRACKING", filed Feb. 5, 2019, all of which are hereby incorporated by reference in their entirety without giving rise to disavowment.

TECHNICAL FIELD

The present disclosure relates to location tracking, in general, and to location tracking of users without disclosing personally identifiable information in particular.

BACKGROUND

Mobile devices have become a necessity which most people in the developed and developing world count on and use for almost any purpose, including but not limited to communicating with friends and business associates using social networks, keeping their calendar, navigating, shopping, "checking in" locations for social networks or other applications, uploading photos and videos into social networks, and many other activities.

Mobile devices are equipped with highly sophisticated technologies, such as geospatial, optical, voice synthesis, radio transceivers, motion detectors and the like, connected together by smart software. Information gathered by the mobile devices, including precise location information of users, activities, or the like, is exposed to the network, being very valuable and informative for different entities, such as commercial companies, malicious parties, financial institutes, governmental organizations or the like. This exposure, however became a serious threat to privacy protection. Some private information, for example shopping habits, may pose a nuisance to a user if leaked to a commercial company, while other information, such as visited locations, can seriously jeopardize aspects of the user's life, such as the user's family, work, or others.

BRIEF SUMMARY

One exemplary embodiment of the disclosed subject matter is a method comprising: obtaining a sequence of location events of a user over time; analyzing the sequence of location events of the user to determine a Point Of Interest (POI) of the user; determining that the POI is a Personally Identifiable Information (PII)-revealing POI; obfuscating the POI, whereby generating a pseudolocation identifier of the POI, wherein the pseudolocation identifier is indicative of a semantic meaning of the POI to the user without revealing a geographic location of the POI; generating an anonymized sequence of location events of the user based on the sequence of location events, wherein the anonymized sequence of location events comprises the pseudolocation identifier to represent location events associated with the POI, wherein the anonymized sequence of location events is absent of the geographic location of the POI; and outputting the anonymized sequence of location events of the user to a third party, whereby enabling the third party to analyze behavior of the user without divulging identity of the user.

Optionally, said obfuscating the POI comprises: applying a transformation function on the geographical location of the POI, wherein the transformation function is a deterministic, one-way function.

Optionally, said obtaining the sequence of location events comprises obtaining one or more location events in the geographical location of the POI, wherein said obtaining the one or more location events is performed by a mobile device of the user using one or more sensors; wherein said obfuscating is performed by the mobile device, whereby preventing divulging to a third party, the geographical location of the POI together with the semantical meaning of the POI with respect to the user.

Optionally, the POI comprises at least one of: a home address of the user, and a work address of the user.

Optionally, the method further comprises: analyzing the sequence of location events of the user to determine a second POI of the user; determining that the second POI is a PII-revealing POI; obfuscating the second POI, whereby generating a second pseudolocation identifier of the second POI, wherein the second pseudolocation identifier is indicative of a semantic meaning of the second POI to the user without revealing a geographic location of the second POI, wherein the second pseudolocation identifier is different from the pseudolocation identifier; wherein the anonymized sequence of location events comprises the pseudolocation identifier to represent location events associated with the POI and the second pseudolocation identifier to represent location events associated with the second POI, wherein the anonymized sequence of location events is absent of the geographic location of the POI and the second POI.

Optionally, the sequence of location events of the user comprises multiple location events associated with the POI over time, wherein a location event associated with the POI occurs when the user is located at the geographic location of the POI; wherein the anonymized sequence of location events comprises multiple appearances of the pseudolocation identifier representing multiple location events associated with the POI over time.

Optionally, the method further comprises: wherein the sequence of location events of the user comprises a first portion and a second portion of location events of the user; wherein said analyzing the sequence of location events of the user comprises analyzing the first portion of location events of the user, wherein the POI of the user is determined based on the first portion of location events of the user; wherein the anonymized sequence of location events of the user is generated based on the second portion of location events.

Optionally, the method further comprises: obtaining a second sequence of location events of the user over time; determining for each location event in the second sequence of location events of the user, whether the location event is associated with the POI of the user; generating a second anonymized sequence of location events of the user based on the second sequence of location events, wherein the second anonymized sequence of location events comprises the pseudolocation identifier to represent location events associated with the POI, wherein the second anonymized sequence of location events is absent of the geographic location of the POI; and outputting the second anonymized sequence of location events of the user to the third party, whereby enabling the third party to analyze behavior of the user without divulging identity of the user.

Optionally, the method further comprises: obtaining a second sequence of location events of a second user over time; analyzing the second sequence of location events of the second user to determine a second POI of the second user; determining that the second POI of the second user is a PII-revealing POI; obfuscating the POI of the second user, whereby generating a second pseudolocation identifier of the second POI of the second user, wherein the second pseudolocation identifier is indicative of a semantic meaning of the second POI to the second user without revealing a geographic location of the second POI of the second user, wherein the semantic meaning of the second POI to the second user is the same as the semantic meaning of the POI to the user, wherein the geographic location of the second POI of the second user is different from the geographic location of the POI of the user; generating a second anonymized sequence of location events of the second user based on the second sequence of location events, wherein the second anonymized sequence of location events comprises the second pseudolocation identifier to represent location events associated with the second POI, wherein the second anonymized sequence of location events is absent of the geographic location of the second POI; and outputting the second anonymized sequence of location events of the second user to the third party, whereby enabling the third party to analyze behavior of the second user without divulging identity of the second user, whereby enabling the third party to analyze the anonymized sequence of location events and the second anonymized sequence of location events, to determine an action based on an activity that is related to a location that has the semantic meaning for a respective user.

Optionally, the method further comprises: wherein said outputting the anonymized sequence of location events of the user comprises providing an identifier of the user to the third party, wherein the identifier does not reveal the identity of the user; retrieving, by the third party, a previously collected anonymized sequence of location events of the user based on the identifier; and updating the anonymized sequence of location events of the user based on the previously collected anonymized sequence of location events.

Optionally, the anonymized sequence of location events of the user comprises a sequence of location identifiers, wherein the location identifiers comprise at least one identifier identifying a geographic location and the pseudolocation identifier.

Optionally, the at least one location identifier indicates a second semantical meaning of a location to the user.

Another exemplary embodiment of the disclosed subject matter is a computerized apparatus having a processor, the processor being adapted to perform the steps of: obtaining a sequence of location events of a user over time; analyzing the sequence of location events of the user to determine a Point Of Interest (POI) of the user; determining that the POI is a Personally Identifiable Information (PII)-revealing POI; obfuscating the POI, whereby generating a pseudolocation identifier of the POI, wherein the pseudolocation identifier is indicative of a semantic meaning of the POI to the user without revealing a geographic location of the POI; generating an anonymized sequence of location events of the user based on the sequence of location events, wherein the anonymized sequence of location events comprises the pseudolocation identifier to represent location events associated with the POI, wherein the anonymized sequence of location events is absent of the geographic location of the POI; and outputting the anonymized sequence of location events of the user to a third party, whereby enabling the third party to analyze behavior of the user without divulging identity of the user.

Yet another exemplary embodiment of the disclosed subject matter is a computer program product comprising a non-transitory computer readable storage medium retaining program instructions, which program instructions when read by a processor, cause the processor to perform a method comprising: obtaining a sequence of location events of a user over time; analyzing the sequence of location events of the user to determine a Point Of Interest (POI) of the user; determining that the POI is a Personally Identifiable Information (PII)-revealing POI; obfuscating the POI, whereby generating a pseudolocation identifier of the POI, wherein the pseudolocation identifier is indicative of a semantic meaning of the POI to the user without revealing a geographic location of the POI; generating an anonymized sequence of location events of the user based on the sequence of location events, wherein the anonymized sequence of location events comprises the pseudolocation identifier to represent location events associated with the POI, wherein the anonymized sequence of location events is absent of the geographic location of the POI; and outputting the anonymized sequence of location events of the user to a third party, whereby enabling the third party to analyze behavior of the user without divulging identity of the user.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings:

FIGS. 3A-3B show schematic illustrations of sequences of location events, in accordance with some exemplary embodiments of the disclosed subject matter;

FIGS. 3C-3D show schematic illustrations of anonymized sequences of location events, in accordance with some exemplary embodiments of the disclosed subject matter.

DETAILED DESCRIPTION

Figure 1A:
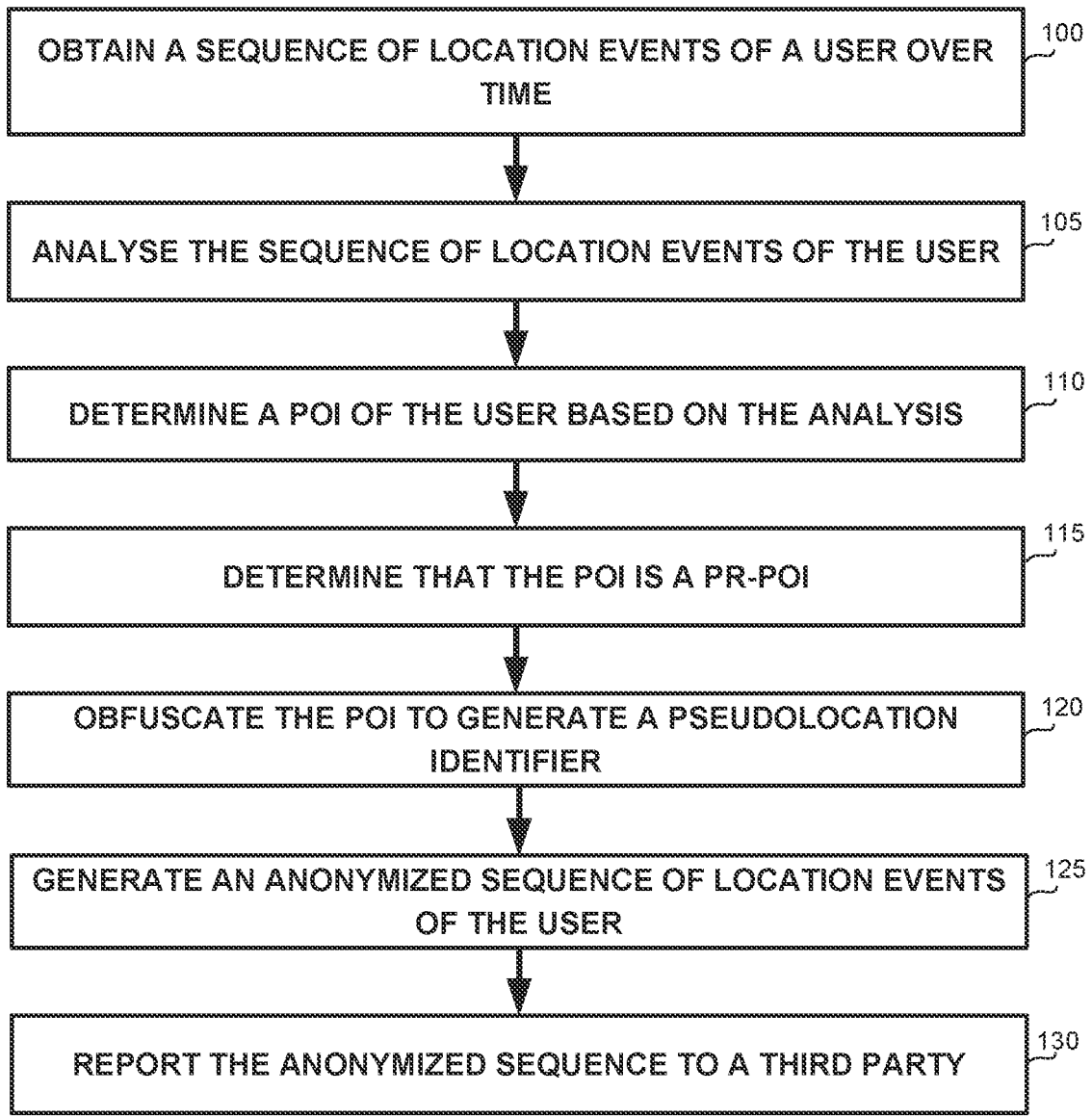
FIGS. 1A-1D show flowchart diagrams of methods, in accordance with some exemplary embodiments of the disclosed subject matter.

One technical problem dealt with by the disclosed subject matter is to provide location tracking of users while preserving privacy of the tracked users. In some exemplary embodiments, location tracking information may be determined based on Points of Interest (POI)s of the user. POIs may be determined based on a sequence of location events of the tracked user. Such location events may be generated after continuously tracking the location of the user, and may be indicative of POIs of the user. In some exemplary embodiments, the sequence of location events may be determined based on periodic location reports, reports of entering a geo-fence, or the like. The sequence of location events may be generated based on the raw locations reported by a smartphone, wearable device, or another user-associated device of the tracked user. POIs of the user may be determined based on the sequence of location events, such as using machine learning techniques. As an example, joint unsupervised learning of embedding for users and POIs based on co-occurrence graphs may be followed by numerous domain-specific learning tasks, unsupervised, semi-supervised or supervised, or the like.

In some exemplary embodiments, the identity of the user may be required to be preserved and used to match future events to the user's sequence. As an example, it may be important to know that POIs X and Y were visited, during some time frame, by the same user, in order to infer relation between POIs X and Y. As another example, it may be important to know that user Z visited a specific POI several times during a certain time frame, in order to determine a pattern of behavior of users in the specific POI. Such data may be used to identify relationships between different POIs, such as a correlation between visitors visiting the POIs, a predetermined order of visiting POIs, or the like. Additionally or alternatively, the data may be used to determine habits or trends related to locations, such as how often a user visits a POI, recently started visiting the POI, connection between the time a user visits a POI and other activities associated with the user, such as whether a POI is visited after work, or at the date when the user didn't go to work at all, or the like.

Although the identity of the user may be retained implicitly, such as using a non-identifying, computer-generated, identifier, the POIs sequence may contain themselves Personally Identifiable Information (PII), allowing to reveal the identity of the user. As an example, the POI sequence, over time, may reveal the user's home address and work address. Such two addresses may be, by themselves, PII, as there may be only a single user who lives at the given home address who also works at the given work address. It may therefore, be desired to remove the PII from the POIs sequence, while preserving the usefulness of the POIs sequence for big data analysis, trend identification, machine learning, other processing, or the like.

One technical solution is to obfuscate and hide some locations by providing an abstraction thereof to be used in the POIs sequence or in the sequence of location events. The abstraction may be used in reported visits instead of POIs that could provide, together with other information, such as other POI visits, the PII.

In some exemplary embodiments, potentially PII-revealing POIs (e.g., POIs that can potentially reveal PII) may be identified within the sequence of location events. The potentially PII-revealing POIs may comprise home location, work location, or any other individually preferred place. In some cases, potentially PII-revealing POIs may be POIs that are visited by the user often, such as over a minimal threshold within a timeframe, that are visited by the user more frequently than other users. Such as POIs with a visit frequency above a relative threshold, an absolute threshold, or the like. It may be appreciated that the POIs sequence generation and analysis may be performed on-device of the user, or by another device that is within the trusted boundaries, such as an organization's server, on-premise computer, or the like; without divulging or exposing private information to non-trusted parties. It mat further be noted that In some exemplary embodiments, the POIs sequence generation and analysis may be performed for several days or weeks, to establish reliable data.

In some exemplary embodiments, an obfuscation of the potentially PII-revealing POIs may be generated, such as by utilizing abstracted pseudolocation instead thereof. The abstractions may preserve the semantic context of the POI but obliviate the actual precise location, thereby removing the PII. As an example, a visit to the user's home may be reported as "Home" or "Home at Santa Monica Area", while reports of a visit to the mall, may be reported with the precise coordinates of the visited mall. As another example, instead of providing the geolocation of the visited work place, "Work" pseudolocation may be reported, potentially together with a geographic area indicator that relates to a large enough area, so as to not divulge PII. As an example, "Work at Sahara Desert" may be too revealing due to a small number of work places and employees in the Sahara Desert, while in New York City, indicating the borough (e.g., Brooklyn) or even avenue (e.g., 5th Avenue) may be sufficient due to a large number of potential work places and employees. The size of the area may be determined automatically, such as based on aggregated information relating to the number of POI events of different users in each area. As a result, the abstraction or pseudolocations may be insufficient to infer the identity of the tracked user, but may still preserve sufficient information for performing analysis and processing, and provide potentially significant value.

In some exemplary embodiments, obfuscation of the potentially PII-revealing POIs may be generated using a privacy-protecting transformation. The privacy-protecting transformation may be communicated to different devices within the trusted boundaries, so that each of which can transform the POIs sequence to an anonymous POIs sequence, prior to communicating it outside the trusted boundaries.

In response to the device of the user reporting a visit event to be recorded in a POIs sequence outside the trusted boundaries, such as in third-party server, cloud-computing platform, or the like; the potentially PII-revealing POIs may be reported only using pseudolocations or other abstractions thereof. Other non-potentially PII-revealing POIs, or location events, may be reported as is. Anonymous sequence of location events, e.g., sequence of location events that comprise the pseudolocations instead of potentially PII-revealing POIs may be utilized for location tracking.

In some exemplary embodiments, the anonymous sequence of location events may be processed to determine location tracking information. In some cases, such information may be aggregated in a cloud-based platform or server, to provide analytics, trends, extract features, or the like. Additionally or alternatively, the information may be analyzed to provide insights regarding the monitored users, in a privacy-preserving manner.

One technical effect of the disclosed subject matter may be providing privacy-preserving POIs sequence, that cannot be used to identify the users themselves, while being able to correctly match each visited POI to the correct POI sequence. As an example, information regarding user X may initially be sent and an initial POI sequence may be compiled. Later on, additional information regarding user X, such as visited POIs made in the following month, may be provided and correctly matched with the initial POI sequence and added thereto.

Another technical effect may relate to the use of the pseudolocations for learning. In some exemplary embodiments, the ability to learn aggregated information about users based on a different physical location but same semantic meaning may be gained. As an example, using pseudolocations, it may be easy to identify a pattern of going from home to a mall, to your work place on Tuesdays, as for each user the home and work address are different. As pseudo-locations with a semantic meaning are used, all users would show the same pattern: "Home", address of mall, "Work". Such by-product may be useful and may require fewer computational resources than unsupervised joint learning based on complete POIs sequences having, for each POI, its precise geolocation.

The disclosed subject matter may provide for one or more technical improvements over any pre-existing technique and any technique that has previously become routine or conventional in the art. Additional technical problem, solution and effects may be apparent to a person of ordinary skill in the art in view of the present disclosure.

Referring now to FIG. 1A showing a flowchart diagram of a method, in accordance with some exemplary embodiments of the disclosed subject matter.

On Step 100, a sequence of location events of a user over time may be obtained. In some exemplary embodiments, the sequence of location events may be obtained from a user-device, such as a mobile phone of the user, a computing device of the user, or the like. The user device may be configured to obtain locations of the user over time. The locations may be obtained by a location module, using one or more sensors of the user-device, such as a GPS receiver, a geomagnetic field sensor, an accelerometer, a proximity sensor, rotation sensors, geomagnetic sensors, or the like. Additionally or alternatively, the user-device may be configured to determine the location based on aggregated information from different sensors and applications, such as using cell-based triangulation, dead-reckoning module, or the like.

On Step 105, the sequence of location events of the user may be analyzed. In some exemplary embodiments, the analysis may be performed on the user-device, by another device that within the trusted boundaries of the user-device, such as an organization's server, on-premise computer, or the like. The analysis may be performed without divulging or exposing private information to non-trusted parties.

On Step 110, a POI of the user may be determined based on the analysis of the sequence of location events of the user.

In some exemplary embodiments, the POI may be associated with locations visited often by the user, such as home location, work location, social activity location, gym, relatives house, or the like. Additionally or alternatively, the POI may be associated with locations visited in routinely in fixed time in the user's schedule, such as a psychologic clinic, a pray house, a school, or the like.

In some exemplary embodiments, the POI may be determined using machine learning techniques on the sequence of location events of the user, such as joint unsupervised learning of embedding for users and POIs based on co-occurrence graphs, domain-specific learning tasks, unsupervised, semi-supervised or supervised, or the like.

On Step 115, a determination whether the POI is a PII-revealing POI may be performed. In some exemplary embodiments, PII-revealing POIs may be POIs that can potentially reveal PII of the user. The PII-revealing POIs may comprise a home location, a work location, or any other individually preferred place. In some cases, potentially PII-revealing POIs may be POIs that are visited by the user very often, such as over a minimal threshold within a timeframe, such as every day, multiple times a week, or the like. Additionally or alternatively, potentially PII-revealing POIs may be POIs that are visited by the user more frequently than by other users, such as visit frequency above a relative threshold, such as the average visit frequency for this location by other user, visit frequency above an absolute threshold, such as general visit frequency to places for users with similar demographical properties, or the like. In some exemplary embodiments, the determination may be performed based on analyzing the sequence of location events over several days or weeks to determine patterns in the user's activity and POIs. Additionally or alternatively, the determination may be performed based on additional information about the user, such as historical sequences of location events, previously determined POIs for the user and association thereof with other locations, or the like.

In some exemplary embodiments, anonymous queries to a server outside the trusted boundaries of the user-device may be performed to determine whether a POI is a potentially PII-revealing POI or not. As an example, queries of how many visits there are in a specific location by the general crowd may be performed. Additionally or alternatively, in order to identify the given POI as belonging to the most common PII-revealing ROI categories (such as Home or Work), one or more classification algorithms could be applied on- or device or within trusted boundaries. Additionally or alternatively, the anonymous queries may be performed to determine an area size relating to the potentially PII-revealing POI, used in anonymization thereof. The anonymous queries may be performed without disclosing the identifier of the user, thereby preventing the use of the queries themselves for extracting PII.

On Step 120, the POI may be obfuscated, and a pseudo-location identifier of the POI may be generated. In some exemplary embodiments, the pseudolocation identifier may be indicative of a semantic meaning of the POI to the user without revealing a geographic location of the POI. As an example, the pseudolocation identifier may be indicative of the POI being related to a living address of the user, such as Home, House, or the like, without revealing the physical address thereof.

In some exemplary embodiments, the obfuscation of the POI may be performed by applying a transformation function on the geographical location of the POI. The transformation function may be a deterministic, one-way function. The transformation function may be configured to determine a transformation for each POI to a corresponding pseudolocation identifier. The transformation function may be configured to determine the same pseudolocation identifier the same POI. The transformation function may be configured to determine different pseudolocation identifiers for different POIs. On the other hand, the POI cannot be retrieved based on the pseudolocation identifier. As an example, the transformation function may be a hash function.

On Step 125, an anonymized sequence of location events of the user may be generated based on the sequence of location events. In some exemplary embodiments, the anonymized sequence of location events may comprise the pseudolocation identifier to represent location events associated with the POI. The anonymized sequence of location events may be absent of the geographic location of the POI. Referring to the above mentioned examples, for each occurrence of the living address of the user in the sequence of location events, the pseudolocation identifier (e.g., Home, House, or the like) may be utilized to replace the living address in the anonymized sequence of location events, without revealing the physical address thereof.

In some exemplary embodiments, the anonymized sequence of location events may comprise multiple appearances of the pseudolocation identifier representing multiple location events associated with the POI over time comprised by the sequence of location events of the user. Referring again to the above mentioned example, each location even associated with the living address of the user, the pseudolocation identifier may appear in the anonymized sequence of location events.

On Step 130, the anonymized sequence of location events of the user may be outputted to a third party. In some exemplary embodiments, the third party may be a server or a device outside the trusted boundaries of the user-device. Using the anonymized sequence of location events of the user, the third party may be enabled to analyze behavior of the user without divulging identity of the user.

In some exemplary embodiments, the anonymized sequence of location events of the user may be transmitted to the third party together with an identifier of the user. The identifier of the user may be an identifier not revealing the identity of the user, such as a random number assigned thereto. The third part may retrieve, based on the identifier of the user, previously collected anonymized POIs sequences of the user. Additionally or alternatively, the anonymized sequence of location events of the user may be added to the historical anonymous POIs sequences of the user, updated in a data storage, or the like.

In some exemplary embodiments, the third party may analyze the anonymized sequence of location events of the user alone or in combination with other POIs sequences, such as anonymized POIs sequences of other users, non-anonymized POIs sequences, or the like.

Figure 1B:
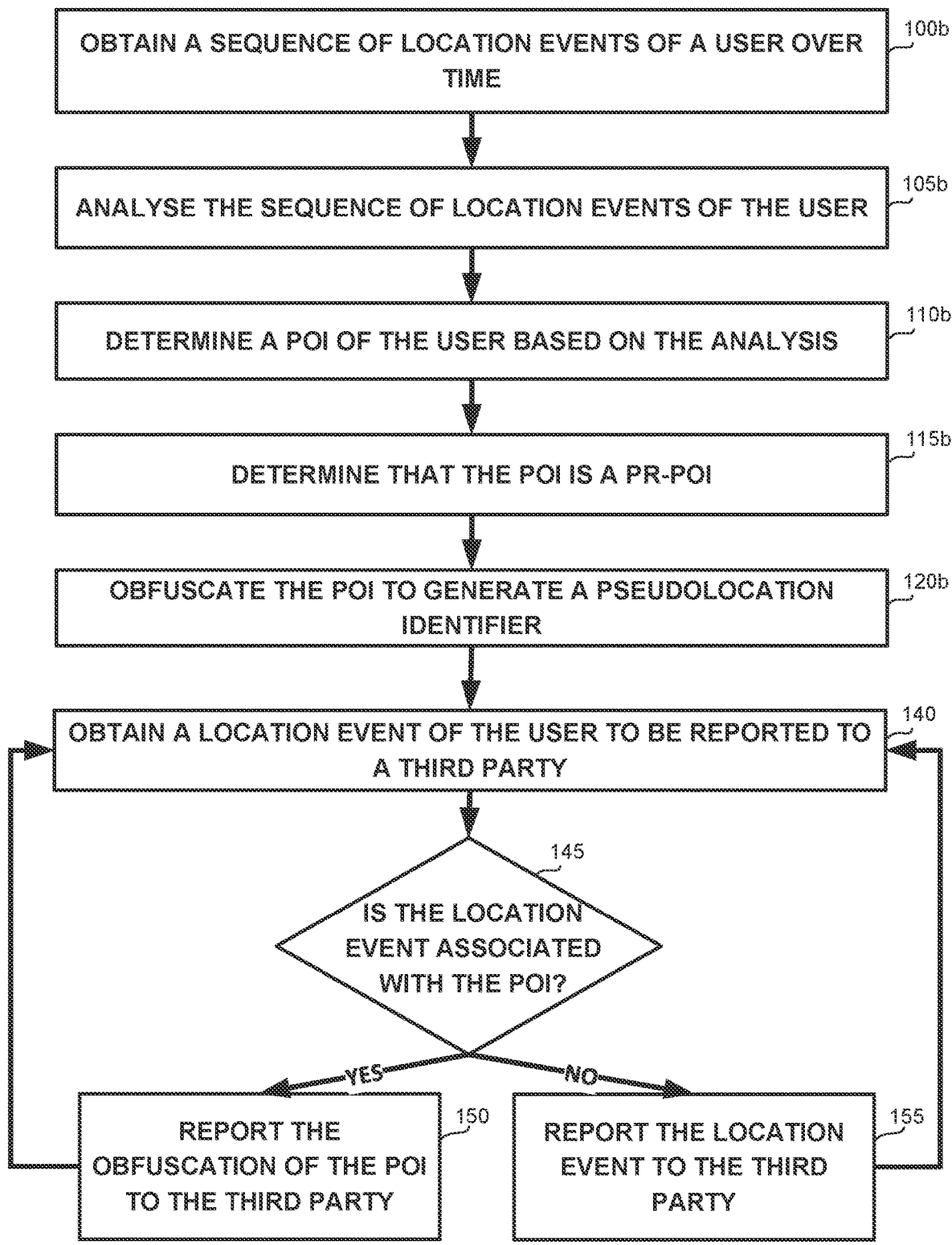

Referring now to FIG. 1B showing a flowchart diagram of a method, in accordance with some exemplary embodiments of the disclosed subject matter.

In some exemplary embodiments, Steps 100b-120b may be similar to Steps 100-125 of FIG. 1A. However, Steps 100b-120b, e.g., obtaining the sequence of location events of a user over time; analyzing the sequence of location events to determine the POI; determining that the POI is a PII-revealing POI and obfuscating thereof; may be performed by a computing device of the user, such as mobile device, or the like. It may be appreciated that Steps 100b-120b may be performed on such a trusted party of the user, to prevent divulging the geographical location of the POI together with the semantical meaning of the POI with respect to the user to a third party.

In some exemplary embodiments, Steps 105b-120b may be repeated to determine additional POIs of the user. A respective unique obfuscation may be performed for each POI.

On Step 140, a location event of the user, to be reported to a third party, may be obtained. The location event may be a single location event, a portion of a sequence of location events to be reported to the third party, or the like.

On Step 145, a determination whether the location event is associate with the POI (or any other POI of the user) may be performed.

In case the location event is associated with a POI of the user, the associated obfuscation (e.g., pseudolocation identifier of the POI) may be reported to the third party (Step 150). Otherwise, e.g., in case the location event is not associated with a POI of the user, the location event may be reported to the third party as is.

Additionally or alternatively, the obfuscation, e.g., by applying the transformation function may always be applied on the POI. However, the transformation function may be configured to replace the POI by a corresponding pseudolocation identifier if the POI is a potentially PII-revealing POI, and keep it unchanged otherwise.

Figure 1C:
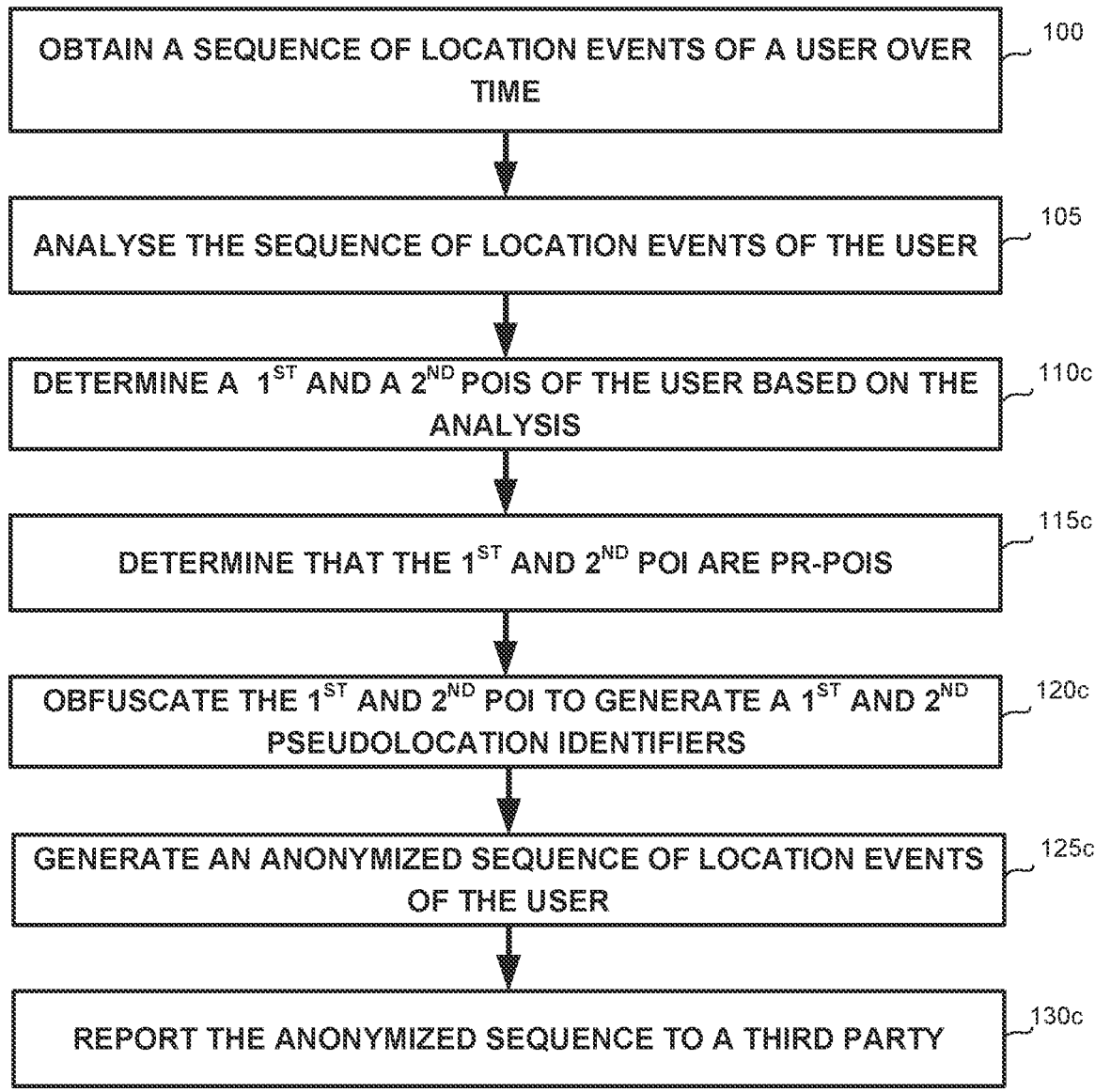

Referring now to FIG. 1C showing a flowchart diagram of a method, in accordance with some exemplary embodiments of the disclosed subject matter.

On Step 100c, a sequence of location events of a user over time may be obtained. Step 100c may be similar to Step 100 of FIG. 1A.

On Step 105, the sequence of location events of the user may be analyzed. Step 105c may be similar to Step 105 of FIG. 1A.

On Step 110c, a plurality of POIs of the user may be determined based on the analysis of the sequence of location events of the user. In some exemplary embodiments, the plurality of POIs may comprise a first POI and a second POI.

On Step 115c, a determination whether the each POI of the plurality of POIs is a PII-revealing POI may be performed. As an example, the first POI and the second POI may be determined to be PII-revealing POIs.

On Step 120c, each POI that was determined to be a PII-revealing POI, may be obfuscated, and a pseudolocation identifier thereof may be generated. In some exemplary embodiments, each pseudolocation identifier may be indicative of a semantic meaning of the associated POI to the user without revealing a geographic location of the associated POI. Different pseudolocation identifiers may be determined for different POIs.

In some exemplary embodiments, the first POI may be obfuscated and a first pseudolocation identifier of the first POI may be generated. Similarly, the second POI may be obfuscated and a second pseudolocation identifier of the second POI may be generated. The second pseudolocation identifier may be different from the first pseudolocation identifier.

On Step 125c, an anonymized sequence of location events of the user may be generated based on the sequence of location events. In some exemplary embodiments, the anonymized sequence of location events may comprise the first pseudolocation identifier to represent location events associated with the first POI, and the second pseudolocation identifier to represent location events associated with the second POI. The anonymized sequence of location events may be absent of the geographic location of the first or the second POIs.

On Step 130c, the anonymized sequence of location events of the user may be outputted to a third party. (Such as in Step 130 of FIG. 1).

Figure 1D:
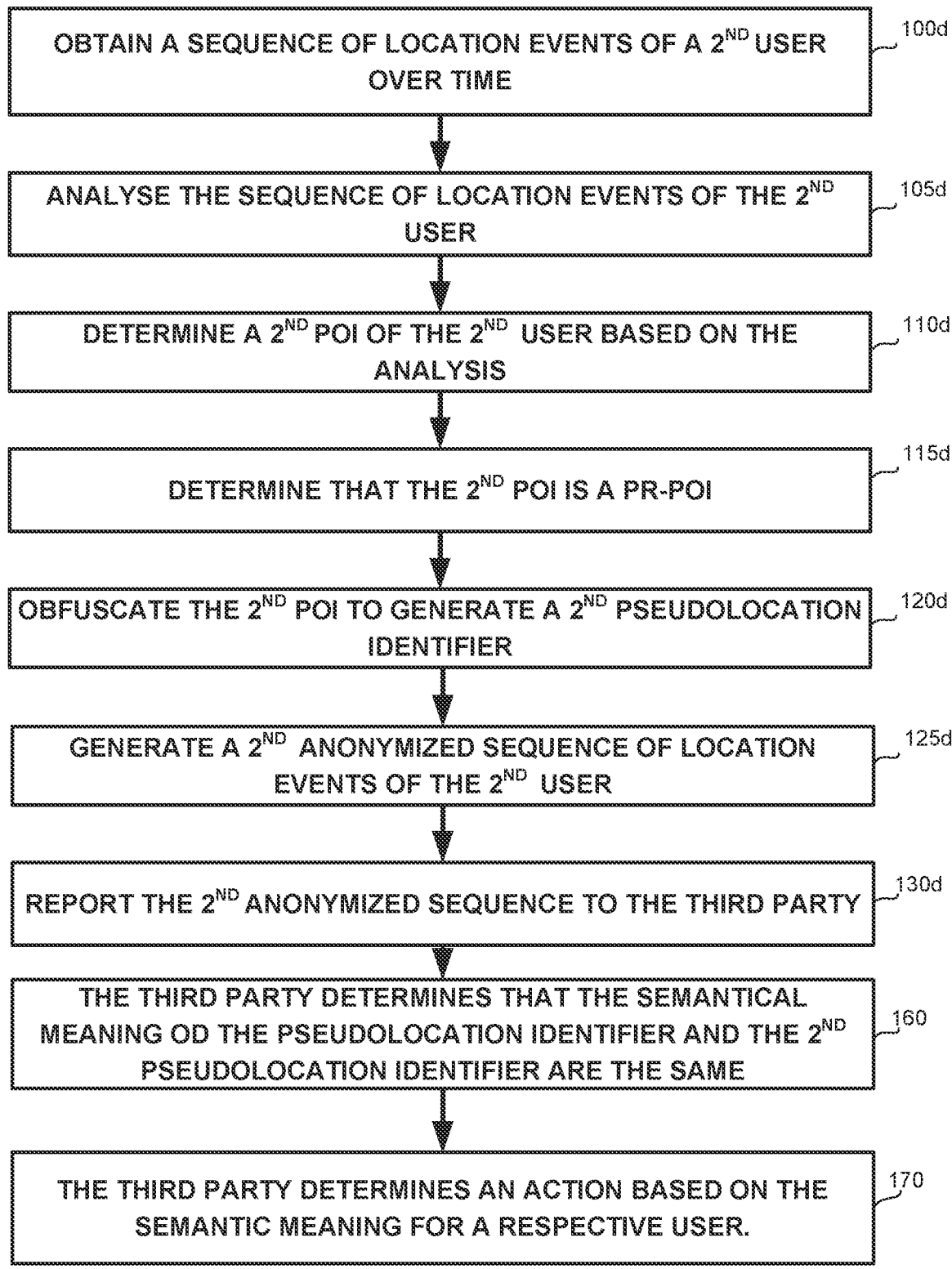

Referring now to FIG. 1D showing a flowchart diagram of a method, in accordance with some exemplary embodiments of the disclosed subject matter.

In some exemplary embodiments, the method depicted in FIG. 1D may be performed together with the method depicted in FIG. 1A, parallel, integrated therein, or the like.

On Step 100d, a second sequence of location events of a second user over time may be obtained. In some exemplary embodiments, the second sequence of location events may be obtained in addition to the sequence of location events obtained in Step 100 of FIG. 1. The second user may be different from the user. In some exemplary embodiments, the second sequence of location events may be obtained from a second user-device, such as a mobile phone of the second user, a computing device of the second user, or the like. The user device may be configured to obtain locations of the user over time.

On Step 105d, the second sequence of location events of the second user may be analyzed. In some exemplary embodiments, the analysis may be performed on the second user-device, by another device that within the trusted boundaries of the second user-device, such as an organization's server, on-premise computer, or the like. The analysis may be performed without divulging or exposing private information to non-trusted parties.

On Step 110*d*, a second POI of the second user may be determined based on the analysis of the second sequence of location events of the second user. In some exemplary embodiments, the second POI may be associated with locations visited often by the second user, locations visited in routinely in fixed time in the second user's schedule, or the like.

On Step 115*d*, a determination whether the second POI is a PII-revealing POI may be performed.

On Step 120*d*, the second POI may be obfuscated, and a second pseudolocation identifier of the second POI may be generated. In some exemplary embodiments, the second pseudolocation identifier may be indicative of a semantic meaning of the second POI to the user without revealing a geographic location of the second POI. It may be appreciated that the second pseudolocation identifier may be different from the pseudolocation identifier, even if the pseudolocation identifier and the second pseudolocation identifier point to similar geographical locations, or the like. Additionally or alternatively, if the pseudolocation identifier and the second pseudolocation identifier are associated with the same semantic meaning to the user and the second user, similar or identical pseudolocation identifiers may be generated for both of them. Additionally or alternatively, an indication that the pseudolocation identifier and the second pseudolocation identifier point are associated with the same semantic meaning may be added to the pseudolocation identifier and the second pseudolocation identifier.

On Step 125*d*, a second anonymized sequence of location events of the second user may be generated based on the second sequence of location events. In some exemplary embodiments, the second anonymized sequence of location events may comprise the second pseudolocation identifier to represent location events associated with the second POI. The second anonymized sequence of location events may be absent of the geographic location of the second POI.

On Step 130*d*, the second anonymized sequence of location events of the second user may be outputted to the third party. In some exemplary embodiments, the third party may be enabled to analyze behavior of the second user without divulging identity of the second user, using the second anonymized sequence of location events of the second user.

In some exemplary embodiments, the second anonymized sequence of location events of the second user may be transmitted to the third party together with an identifier of the second user. The identifier of the second user may be an identifier not revealing the identity of the second user. The identifier of the second user may be different from the identifier of the user. The third part may retrieve, based on the second identifier of the second user, previously collected anonymized POIs sequences of the second user. Additionally or alternatively, the second anonymized sequence of location events of the second user may be added to the historical anonymous POIs sequences of the second user, updated in a data storage, or the like.

In some exemplary embodiments, the third party may analyze the second anonymized sequence of location events of the second user alone or in combination with other POIs sequences, such the anonymized sequence of location events of the user obtained in Step 130 of FIG. 1A.

On Step 160, a determination that the semantical meaning of the pseudolocation identifier of the POI of the user (determined in Step 120 of FIG. 1A) and the semantical meaning of the second pseudolocation identifier of the second POI of the second user (determined in Step 120*d* of FIG. 1D) are the same, may be performed. In some exemplary embodiments, the determination may be performed by the third party. The determination may be performed based on similarity between the pseudolocation identifier and the pseudolocation identifier, based on a utilizing certain keywords such as Home or Work, based on explicit indication of the semantic meaning, or the like.

On Step 170, an action may be determined based on the semantic meaning of a respective user. In some exemplary embodiments, the third party may analyze behavior of the user without divulging identity of the user, based on the anonymized sequence of location events. The third party may analyze behavior of the second user without divulging identity of the second user, based on the second anonymized sequence of location events. The third party may be configured to determine actions or activities related to the user in locations associated with the semantic meaning of the pseudolocation identifier and the second pseudolocation identifier, such as both being related to living locations of the users. The third party may determine an action based on an activity that is related to a location that has the same semantic meaning for a respective user. As an example, the third party may determine an action (such as advertising a certain add, performing an update of the user-device, activating a smart device, or the like), for a respective user, based on the user being in a location with the same semantic meaning as the pseudolocation identifier, e.g., home, or a living address.

Figure 2A:
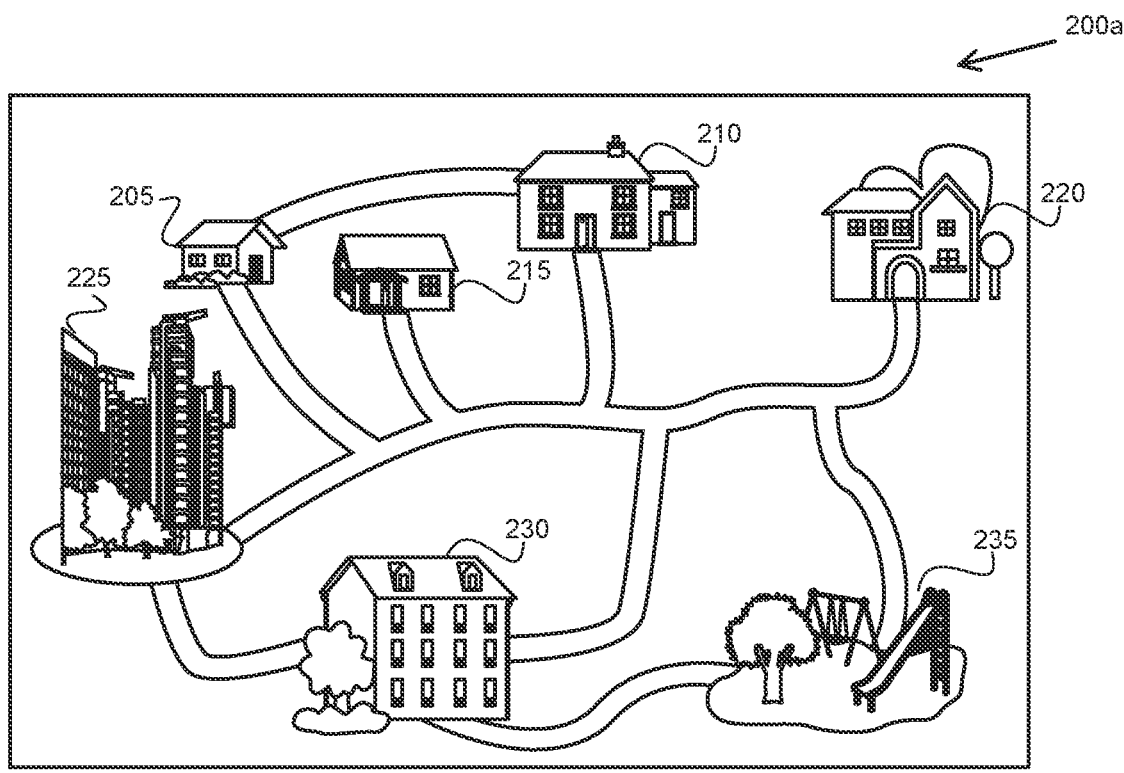
FIGS. 2A-2B show schematic illustrations of maps, in accordance with some exemplary embodiments of the disclosed subject matter.
Figure 2B:
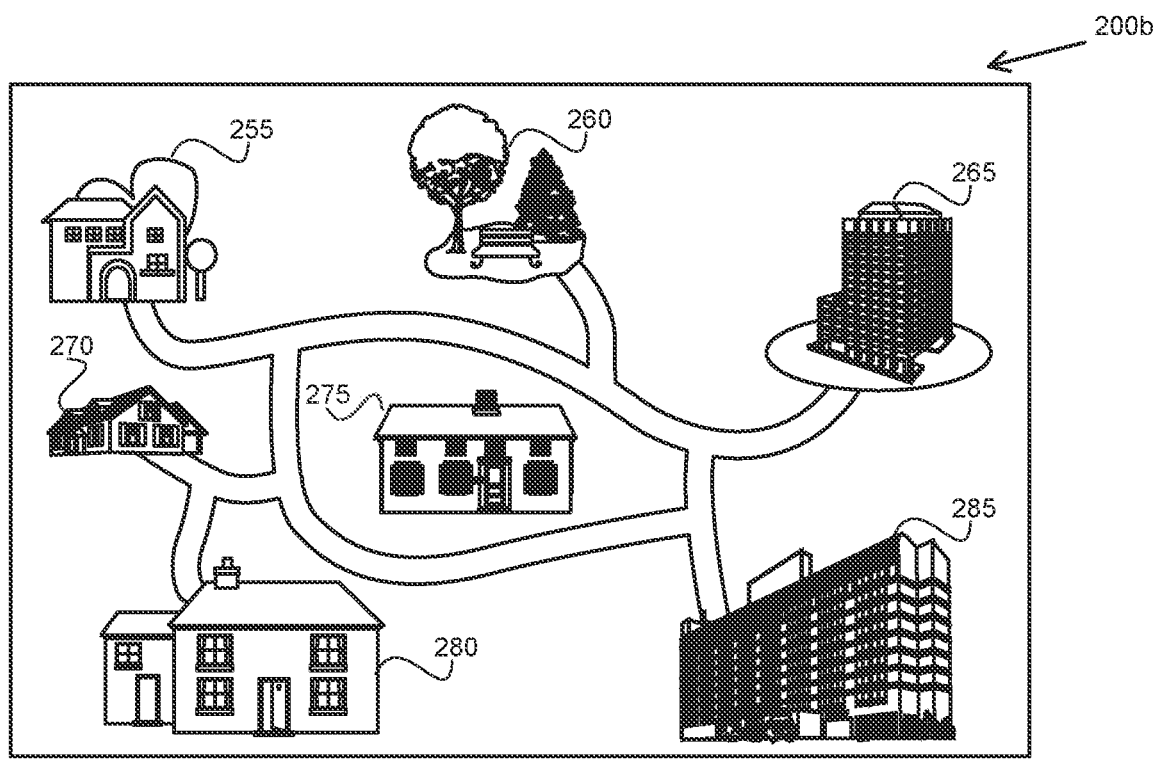

Referring now to FIGS. 2A-2B showing schematic illustrations of maps, in accordance with some exemplary embodiments of the disclosed subject matter.

In some exemplary embodiments, Map 200*a* may comprise locations visited by a first user (not shown), and Map 200*b* may comprise locations visited by a second user (not shown). The first user and the second user may not be related. Map 200*a* and Map 200*b* may represent different locations, may or may not overlap, may represent distinct geographical areas, or the like.

In some exemplary embodiments, geographical locations of each site in Map 200*a* or Map 200*b*, such as an intermediate point, a place, a route, a line of travel, a stopping point or point at which course is changed, or the like; may be represented using waypoints. Each waypoint may refer to coordinates which specify the geographical position on the globe, such as but not limited to, Global Positioning System (GPS) coordination. Different locations having different geographic positions may be represented by different waypoints referring to different coordinates. As an example, Location 225 on Map 200*a* may have approximate GPS coordination of (32.82, 34.99), where the latitude coordination is 32.82312 and the longitude coordination is 34.991858. As another example, Location 285 on Map 200*b* may have approximate GPS coordination of (33.01, 35.09), where the latitude coordination is 33.006376 and the longitude coordination is 35.092215.

In some exemplary embodiments, some locations on Map 200*a* and Map 200*b* may be POIs of the first and the second users, respectively. As an example, Location 205 in Map 200*a* may represent the first user's home. As another example, location 265 may represent a shopping center visited regularly by the second user.

Referring now to FIGS. 3A-3B showing schematic illustrations of sequences of location events, in accordance with some exemplary embodiments of the disclosed subject matter.

In some exemplary embodiments, Sequence 300a may represent a sequence of location events of the first user over time. Sequence 300b may represent a sequence of location events of the second user. In some exemplary embodiments, Sequence 300a and Sequence 300b may be generated based on continuously monitoring and tracking the location of the first and the second user. Sequence 300a and Sequence 300b may be determined based on periodic location reports, reports of entering a geo-fence, raw locations reported by user-devices of the first and the second users, such as smartphone, wearable device, or the like. Additionally or alternatively, Sequence 300a and Sequence 300b or portions thereof may be determined based on activity of the first and the second users on social network, such as "checking in", updating a location, or the like.

In some exemplary embodiments, Sequence 300a and Sequence 300b may be analyzed to determine POIs of the user. The POIs may be determined based on appearances, stay duration, cyclicality, periodicity, or the like of the location events. As an example, based on the analysis of Sequence 300a the following locations may be determined to be POIs of the first user: Location 205, Location 210, Location 215, Location 220, Location 225, Location 230 and Location 235. As another example, based on the analysis of Sequence 300b the following locations may be determined to be POIs of the second user: Location 255, Location 260, Location 265, Location 270, Location 275, Location 280 and Location 285.

In some exemplary embodiments, a determination whether the determined POIs contain PII, such as the user's home address and work address. In some exemplary embodiments, a semantic meaning of each POI to the user may be determined. The semantic meaning may be determined based on input from the user, based on data from the user's device, based of demographic data of the user, based on personal information of the user, based on activity in the social networks, or the like. Additionally or alternatively, the semantic meaning may be determined based on information regarding the location, such as a known address of a school, a play yard, a shopping mall, a public place, or the like.

As an example, based on the analysis of Sequence 300a, Location 205 may be determined to be the house of the first user, based on the hours of staying therein, thus having the semantical meaning of Home. As another example, Location 210 may be determined to be the house of the first user parents, based on input from the first user herself; thus having the semantical meaning of Parent's House. As yet other examples, Location 225 may be determined to be work place, Location 230 may be determined to be a school, and Location 235 may be determined to be a play yard. Location 215 and Location 220 may be POI's with unknown semantic meaning, unspecific semantic meaning, with a general semantic meaning, such as a place related to friends, friend's house, or the like. Similarly, based on the analysis of Sequence 300b Location 270 may be determined to be the house of the second user; Location 260 may be determined to be a public place, or even more specifically a park; Location 265 may be determined to be a public place, or more specifically a shopping center; Location 275 may be determined to be a health care place, or more specifically a clinic; and Location 285 may be determined to be work place of the second user. Location 255 and Location 280 may be POI's with unknown semantic meaning, unspecific semantic meaning, with a general semantic meaning, such as a place related to friends, friend's house, or the like.

In some exemplary embodiments, POI's with semantic meaning related to PII may be determined to be potentially PII-revealing POIs. As an example, POIs with a semantic meaning of home, parents house, work, health care locations, or the like, may be determined to be PII-revealing POIs.

It may be noted that in some cases, some locations may be seemed to be POI, based on being repeated in the sequence of location events, such as coordinates (34.15, 34.92) and coordinates (34.98;35.00) in Sequence 300b. Such coordinates may not necessarily be associated with a meaningful physical location, may be associated with road junctions, locations on the road between frequently visited POI's, or the like. In some cases, such locations, along with other POI's, may be determined to be potentially PII-revealing POIs. As an example, an address that is located near a POI with a semantic meaning of Home, may be indicative of the home address. An adaptive obfuscation may be determined in such cases. Additionally or alternatively, such locations may not be provided with timestamps, or information indicative of distance, or the like.

Referring now to FIGS. 3C-3D showing schematic illustrations of anonymized sequences of location events, in accordance with some exemplary embodiments of the disclosed subject matter.

In some exemplary embodiments, anonymized sequences of location events may be generated based on the sequence of location events of the users. As an example, Anonymized Sequence 300c may be generated based on Sequence 300a; and Anonymized Sequence 300d may be generated based on Sequence 300b.

In some exemplary embodiments, anonymized sequences of location events may be designed to comprise obfuscations of the PII-revealing POIs, such as pseudolocation identifiers thereof that are indicative of the semantic meaning of the POI to the user without revealing a geographic location of the POI.

As an example, for each appearance of Location 205 in Sequence 300a, Anonymized Sequence 300c comprises the pseudolocation identifier "Home 123". As another example, Location 210 in Sequence 300a may be replaced with the pseudolocation identifier "Parent's House" in Anonymized Sequence 300c. As yet other examples, Location 225 in Sequence 300a may be replaced with the pseudolocation identifier "Work", Location 230 in Sequence 300a may be replaced with the pseudolocation identifier "School". Similarly, instead of Location 270, Anonymized Sequence 300d may comprise the pseudolocation identifier "Home"; instead of Location 275, Anonymized Sequence 300d may comprise the pseudolocation identifier "Clinic"; and instead of Location 285, Anonymized Sequence 300d may comprise the pseudolocation identifier "Work".

It may be noted that Anonymized Sequence 300c and Anonymized Sequence 300d comprise both location identifiers identifying a geographic location of the users, such as Location 235 and waypoint (32.75, 33.52) in Anonymized Sequence 300c; and pseudolocation identifiers, such as Home123 in Anonymized Sequence 300c and Home Anonymized Sequence 300d.

In some exemplary embodiments, the location identifiers may indicate both geographical location and semantical meaning of a location to the user. As an example, the identifier "Park at Location 260" may indicate the semantical meaning of a park at a specific geographical location of Location 260.

In some exemplary embodiments, Anonymized Sequence 300c and Anonymized Sequence 300d may be provided a third party in order to analyze behavior of the first and the second users without divulging identity thereof. The third party may be configure to analyze the activities of the first and the second users in locations having similar semantic meaning, such as "Home123" and "Home", locations having the same semantical meaning, such as "Work", relation between different locations with related semantic meaning, such as "Home" and "Parent's House", or the like. The third party may be enabled to determine information or actions related to a third user, based on an activity that is related to a location that has the same semantic meaning for both the third user and the first or second users.

As an example, based on learning that POIs X and Y were visited, during some time frame, by the same user, in order to infer relation between POIs X and Y, such as visiting the play yard after visiting the school, visiting the parent's house daily after being at home and before heading to school may be indicative of dropping a younger child to be under the grandparents care, or the like. As another example, learning that user Z visits a specific POI several times during a certain time frame, in order to determine a pattern of behavior of users in the specific POI, such as the second user visiting the clinic weekly in a specific time may be indicative of a health condition requiring continuous care, such as dialysis, physiotherapy, psychotherapy, or the like.

Figure 4:
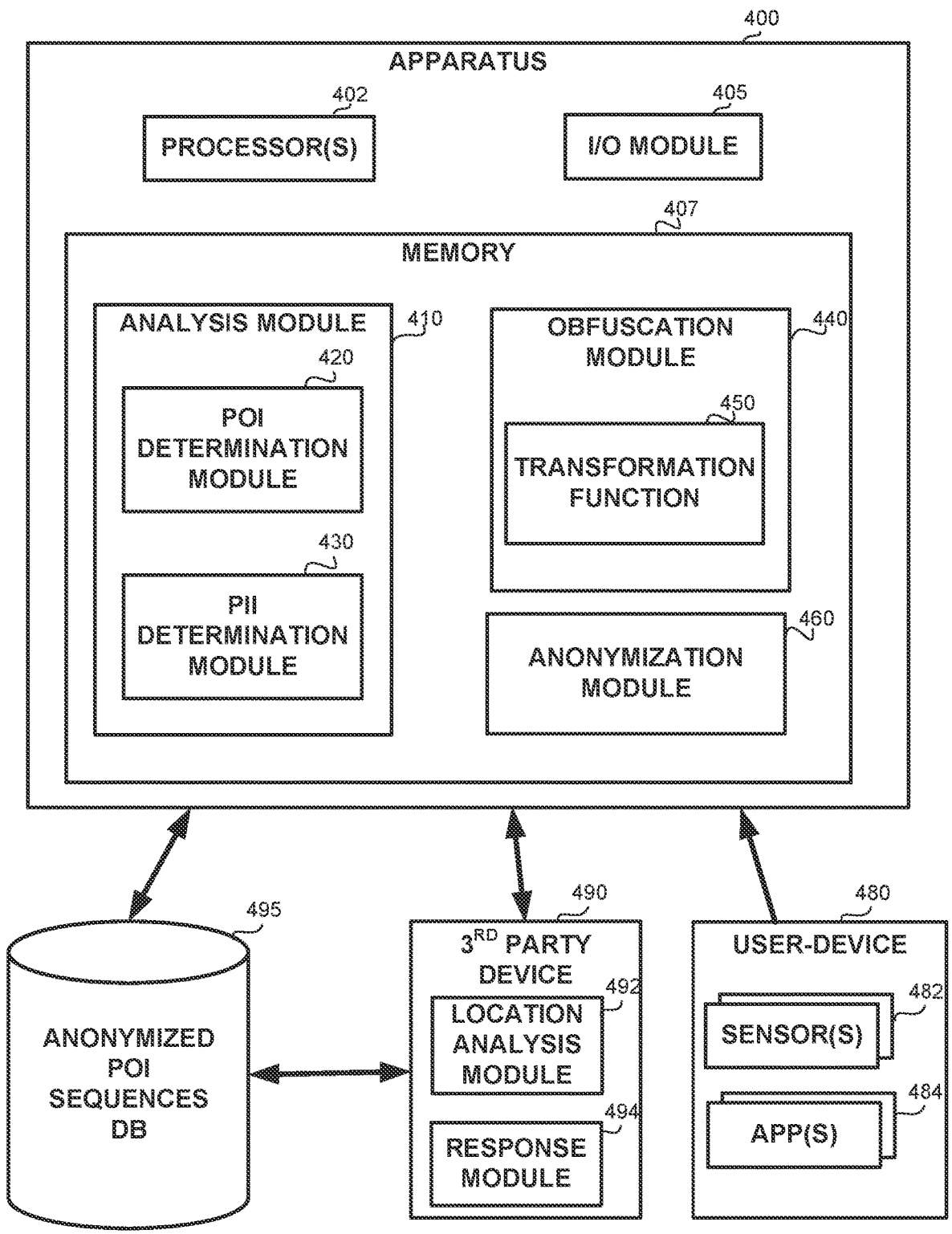
FIG. 4 shows a schematic illustration of an exemplary architecture, in accordance with some exemplary embodiments of the disclosed subject matter.

Referring now to FIG. 4 showing a block diagram of an apparatus, in accordance with some exemplary embodiments of the disclosed subject matter. An Apparatus 400 may be configured to support parallel user interaction with a real world physical system and a digital representation thereof, in accordance with the disclosed subject matter.

In some exemplary embodiments, Apparatus 400 may comprise one or more Processor(s) 402. Processor 402 may be a Central Processing Unit (CPU), a microprocessor, an electronic circuit, an Integrated Circuit (IC) or the like. Processor 402 may be utilized to perform computations required by Apparatus 400 or any of it subcomponents.

In some exemplary embodiments of the disclosed subject matter, Apparatus 400 may comprise an Input/Output (I/O) module 405. I/O Module 405 may be utilized to receive input from a user via a User Device 480, such as, for example obtaining location events, sequences of location events, personal information, activities, or the like. Additionally or alternatively, I/O Module 405 may be utilized to provide an output, such as anonymized sequences of location events, to users, devices, servers, or the like, such as Third Party Device 490, Anonymized POI Sequences Database 495, or the like.

In some exemplary embodiments, Apparatus 400 may comprise Memory 407. Memory 407 may be a hard disk drive, a Flash disk, a Random Access Memory (RAM), a memory chip, or the like. In some exemplary embodiments, Memory 407 may retain program code operative to cause Processor 402 to perform acts associated with any of the subcomponents of Apparatus 400.

In some exemplary embodiments, Analysis Module 410 may be configured to analyze sequences of location events of users over time obtained from one or more devices such as User Device 480.

In some exemplary embodiments, Analysis Module 410 may be configured to utilize a POI Determination Module 420 in order to determine POIs of the associated user, based on the analysis of the sequence of location events of the user.

In some exemplary embodiments, PII Determination Module 430 be configured to determine, for each POI determined by POI Determination Module 420, if the POI is a PII-revealing POI.

In some exemplary embodiments, Obfuscation Module 440 may be configured to obfuscate each POI that was determined by PII Determination Module 430 to be PII-revealing POI. Obfuscation Module 440 may be configured to generate for each potentially PII-revealing POI, a unique pseudolocation identifier thereof. The unique pseudolocation identifier is indicative of a semantic meaning of the POI to the user without revealing a geographic location of the POI.

In some exemplary embodiments, Obfuscation Module 440 may be configured to apply a Transformation Function 450 on the potentially PII-revealing POI, in order to generate the pseudolocation identifier thereof. Transformation Function 450 may be a deterministic one-way function. Transformation Function 450 may be configured to return different pseudolocation identifiers for different POIs. The POI may not be traceable by the pseudolocation identifier. The pseudolocation identifier determined by applying Transformation Function 450, may not divulge the geographical location of the POI together with the semantical meaning of the POI with respect to the user. As an example, the pseudolocation identifier may be a textual identifier representing the semantical meaning of the POI with respect to the user, without any additional information hinting to the geographical location thereof.

In some exemplary embodiments, Anonymization Module 460 may be configured to generate, for each obtained sequence of location events, an anonymized sequence of location events. The anonymized sequence of location events may be generated based on the sequence of location events of the user. The anonymized sequence of location events may comprise the pseudolocation identifiers to represent location events associated with the respective potentially PII-revealing POIs. The anonymized sequence of location events may be absent of the geographic locations of the potentially PII-revealing POIs.

In some exemplary embodiments, the sequence of location events of the user obtained via I/O Module 405, may comprise a first portion and a second portion of location events of the user. The analysis of the sequence of location events of the user by Analysis Module 410, may be performed on the first portion of location events of the user. As a result, Analysis Module 410 may be configured to determine the POI of the user based only on the first portion of location events of the user. The anonymized sequence of location events generated by Anonymization Module 460, may be generated based on the second portion of location events.

In some exemplary embodiments, Apparatus 400 may be configured to output the anonymized sequences of location events of the users to a third party, such as Third Party Device 490, Anonymized POI Sequences DB 495, or the like. The anonymized sequences of location events may be outputted via I/O Module 405.

In some exemplary embodiments, Location Analysis Module 492 of Third Party Device 490 may be configured to analyze behavior of the user, based on the anonymized sequences of location events, without divulging identity of the user. Additionally or alternatively, Location Analysis Module 492 may be configured to determine similarity between semantic meanings of different POIs for different users, and determine conclusions and actions regarding such semantical meanings for different users. Response Module 494 may be configured to determine an action based on an activity that is related to a location that has the same semantic meaning for a respective user.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
    obtaining a sequence of location events of a user over time;
    analyzing the sequence of location events of the user to determine a Point of Interest (POI) of the user;
    generating a pseudolocation identifier of the POI, wherein the pseudolocation identifier is indicative of a semantic meaning of the POI to the user without revealing a geographic location of the POI, the semantic meaning defining a personal relation between the user and the POI;
    generating an anonymized sequence of location events of the user based on the sequence of location events, wherein the anonymized sequence of location events is absent of the geographic location of the POI, wherein the anonymized sequence of location events comprise pairs of location indications and corresponding times in which the user was at the respective location, wherein the location indications include at least one geographic location of a non-POI location and the pseudolocation identifier, whereby the anonymized sequence of location event mixes between concrete geographic locations and abstract indications that are indicative of semantic meanings of one or more POIs without revealing a geographic location of the respective one or more POIs; and
    outputting the anonymized sequence of location events of the user to a third party, whereby enabling the third party to analyze behavior of the user without divulging identity of the user.

2. The method of claim 1, wherein said generating an anonymized sequence comprises:
    applying a transformation function on the geographical location of the POI, wherein the transformation function is a deterministic, one-way function.

3. The method of claim 1
    wherein said obtaining the sequence of location events comprises obtaining one or more location events in the geographical location of the POI, wherein said obtaining the one or more location events is performed by a mobile device of the user using one or more sensors and wherein said generating an anonymized sequence is performed by the mobile device, whereby preventing divulging to a third party, the geographical location of the POI together with the semantical meaning of the POI with respect to the user.

4. The method of claim 1, wherein the POI comprises at least one of: a home address of the user, and a work address of the user.

5. The method of claim 1
    wherein the sequence of location events of the user comprises multiple location events associated with the POI at different time points, wherein a location event associated with the POI occurs when the user is located at the geographic location of the POI;
    wherein the anonymized sequence of location events comprises multiple appearances of the pseudolocation identifier representing multiple location events associated with the POI at the different time points.

6. The method of claim 1, further comprises:
    wherein the sequence of location events of the user comprises a first portion and a second portion of location events of the user;
    wherein said analyzing the sequence of location events of the user comprises analyzing the first portion of location events of the user, wherein the POI of the user is determined based on the first portion of location events of the user;
    wherein the anonymized sequence of location events of the user is generated based on the second portion of location events.

7. The method of claim 1, further comprises:
    obtaining a second sequence of location events of the user over time;
    determining for each location event in the second sequence of location events of the user, whether the location event is associated with the POI of the user;
    generating a second anonymized sequence of location events of the user based on the second sequence of location events, wherein the second anonymized sequence of location events comprises the pseudolocation identifier to represent location events associated with the POI, wherein the second anonymized sequence of location events is absent of the geographic location of the POI; and
    outputting the second anonymized sequence of location events of the user to the third party, whereby enabling the third party to analyze behavior of the user without divulging identity of the user.

8. The method of claim 1, wherein the location indications comprise a second semantical meaning of a location to the user, the second pseudolocation identifier of a second POI, the second pseudolocation identifier indicating a semantic meaning of the second POI to the user without revealing a geographic location of the second POI, the second POI is different than the POI.

9. A computerized apparatus having a hardware processor, the hardware processor being coupled to a memory, the hardware processor being adapted to perform the steps of:
    obtaining a sequence of location events of a user over time;
    analyzing the sequence of location events of the user to determine a Point of Interest (POI) of the user;
    determining that the POI is a Personally Identifiable Information (PII)-revealing POI;
    obfuscating the POI, whereby generating a pseudolocation identifier of the POI, wherein the pseudolocation identifier is indicative of a semantic meaning of the POI to the user without revealing a geographic location of the POI, the semantic meaning defining a personal relation between the user and the POI;
    generating an anonymized sequence of location events of the user based on the sequence of location events, wherein the anonymized sequence of location events comprises the pseudolocation identifier to represent location events associated with the POI, wherein the anonymized sequence of location events is absent of the geographic location of the POI; and outputting the anonymized sequence of location events of the user to a third party, whereby enabling the third party to analyze behavior of the user without divulging identity of the user.

10. The computerized apparatus of claim 9, wherein said apparatus is further configured to perform:

wherein the sequence of location events of the user comprises multiple location events associated with the POI over time, wherein a location event associated with the POI occurs when the user is located at the geographic location of the POI;

wherein the anonymized sequence of location events comprises multiple appearances of the pseudolocation identifier representing multiple location events associated with the POI over time.

11. The computerized apparatus of claim 9, wherein said apparatus is further configured to perform:

wherein the sequence of location events of the user comprises a first portion and a second portion of location events of the user;

wherein said analyzing the sequence of location events of the user comprises analyzing the first portion of location events of the user, wherein the POI of the user is determined based on the first portion of location events of the user;

wherein the anonymized sequence of location events of the user is generated based on the second portion of location events.

12. The computerized apparatus of claim 9, wherein the anonymized sequence of location events of the user comprises a sequence of location identifiers, wherein the location identifiers comprise at least one identifier identifying a geographic location and the pseudolocation identifier.

13. The computerized apparatus of claim 12, wherein the at least one location identifier indicates a second semantical meaning of a location to the user.

14. A computer program product comprising a non-transitory computer readable storage medium retaining program instructions, which program instructions when read by a processor, cause the processor to perform a method comprising:

obtaining a sequence of location events of a user over time;

analyzing the sequence of location events of the user to determine a Point of Interest (POI) of the user;

determining that the POI is a Personally Identifiable Information (PII)-revealing POI;

obfuscating the POI, whereby generating a pseudolocation identifier of the POI, wherein the pseudolocation identifier is indicative of a semantic meaning of the POI to the user without revealing a geographic location of the POI, the semantic meaning defining a personal relation between the user and the POI;

generating an anonymized sequence of location events of the user based on the sequence of location events, wherein the anonymized sequence of location events comprises the pseudolocation identifier to represent location events associated with the POI, wherein the anonymized sequence of location events is absent of the geographic location of the POI; and outputting the anonymized sequence of location events of the user to a third party, whereby enabling the third party to analyze behavior of the user without divulging identity of the user.

15. The computer program product of claim 14, wherein said obfuscating the POI comprises:

applying a transformation function on the geographical location of the POI, wherein the transformation function is a deterministic, one-way function.

16. The computer program product of claim 14, wherein said obtaining the sequence of location events comprises obtaining one or more location events in the geographical location of the POI, wherein said obtaining the one or more location events is performed by a mobile device of the user using one or more sensors; and wherein said obfuscating is performed by the mobile device, whereby preventing divulging to a third party, the geographical location of the POI together with the semantical meaning of the POI with respect to the user.

17. The computer program product of claim 14, wherein the POI comprises at least one of: a home address of the user, and a work address of the user.

18. The computer program product of claim 14, wherein the sequence of location events of the user comprises multiple location events associated with the POI over time, wherein a location event associated with the POI occurs when the user is located at the geographic location of the POI;

wherein the anonymized sequence of location events comprises multiple appearances of the pseudolocation identifier representing multiple location events associated with the POI over time.

19. The computer program product of claim 14, wherein the anonymized sequence of location events of the user comprises a sequence of location identifiers, wherein the location identifiers comprise at least one identifier identifying a geographic location and the pseudolocation identifier, wherein the at least one location identifier indicates a second semantical meaning of a location to the user.

20. A method comprising:

obtaining a pseudolocation identifier of a Point of Interest (POI) of a user, the POI has a semantic meaning to the user, the POI has a geographic location, the pseudolocation identifier is indicative of the semantic meaning of the POI to the user without revealing the geographic location of the POI;

obtaining, in a mobile device of the user, a sequence of location events of the user over time;

determining, in the mobile device of the user, for each location event in the sequence of location events of the user, whether the location event is associated with the POI of the user;

generating, in the mobile device of the user, an anonymized sequence of location events of the user based on the sequence of location events, wherein the anonymized sequence of location events comprises the pseudolocation identifier to represent location events associated with the POI and at least one geographic location of a non-POI location, wherein the anonymized sequence of location events is absent of the geographic location of the POI, whereby the anonymized sequence of location event mixes between concrete geographic locations and abstract indications that are indicative of semantic meanings of one or more POIs without revealing a geographic location of the respective one or more POIs; and transmitting, by the mobile device of the user, the anonymized sequence of location events of the user to a device of a third party, whereby enabling the third party to analyze behaviour of the user without divulging identity of the user.

\* \* \* \* \*